US010240579B2

United States Patent
Saddoughi et al.

(10) Patent No.: US 10,240,579 B2
(45) Date of Patent: Mar. 26, 2019

(54) APPARATUS AND METHOD FOR AERODYNAMIC PERFORMANCE ENHANCEMENT OF A WIND TURBINE

(71) Applicant: General Electric Company, Schenectady, NY (US)

(72) Inventors: Seyed Gholamali Saddoughi, Clifton Park, NY (US); Matthew Patrick Boespflug, Clifton Park, NY (US); Michael Solomon Idelchik, Niskayuna, NY (US); Grover Andrew Bennett, Esperance, NY (US)

(73) Assignee: General Electric Company, Schenectady, NY (US)

( * ) Notice: Subject to any disclaimer, the term of this patent is extended or adjusted under 35 U.S.C. 154(b) by 353 days.

(21) Appl. No.: 15/007,858

(22) Filed: Jan. 27, 2016

(65) Prior Publication Data

US 2017/0211545 A1    Jul. 27, 2017

(51) Int. Cl.
*F03D 1/06* (2006.01)
*F03D 15/00* (2016.01)
*F03D 7/02* (2006.01)

(52) U.S. Cl.
CPC ........... *F03D 7/022* (2013.01); *F03D 1/0666* (2013.01); *F03D 7/024* (2013.01); *F03D 15/05* (2016.05);
(Continued)

(58) Field of Classification Search
CPC .... F03D 1/0625; F03D 1/0633; F03D 1/0666; F03D 1/0675; F03D 7/022; F03D 7/024;
(Continued)

(56) References Cited

U.S. PATENT DOCUMENTS

| 4,140,433 A | 2/1979 | Eckel |
| 5,380,149 A | 1/1995 | Valsamidis |

(Continued)

FOREIGN PATENT DOCUMENTS

JP    WO 2015132884 A1 *   9/2015   ............. F03D 7/022

OTHER PUBLICATIONS

Saddoughi, "ECO ROTR (Energy Capture Optimization by Revolutionary Onboard Turbine Reshape)—How did it all begin?", GE Global Research, http://www.geglobalresearch.com/blog/eco-rotr-energy-capture-optimization-by-optimization-by-revolutionary-onboard-turbine-reshape-how-did-it-all-begin, Jun. 18, 2015, retrieved on Jul. 31, 2015.

*Primary Examiner* — Igor Kershteyn
*Assistant Examiner* — Christopher R Legendre
(74) *Attorney, Agent, or Firm* — Mary Louise Stanford (57) ABSTRACT

A virtual aerodynamic component for a wind turbine including at least one rotor blade connected to a hub. The at least one rotor blade defines an inner portion and a profiled outer portion. The virtual aerodynamic component includes one or more air-blowing units configured to provide a flow of air substantially opposed to an incoming wind. The flow of air defines the virtual aerodynamic component in front of the inner portion of the at least one rotor blade and provides for redirection of the incoming wind toward the profiled outer portion of the at least one rotor blade in an operational state and allows the incoming wind to flow toward the inner portion of the at least one rotor blade in a non-operational state. Further described is a wind turbine including the above-described virtual aerodynamic component and method for aerodynamic performance enhancement of an existing wind turbine.

14 Claims, 6 Drawing Sheets

(52) U.S. Cl.
CPC ... *F05B 2220/30* (2013.01); *F05B 2240/2211* (2013.01); *Y02E 10/721* (2013.01); *Y02E 10/723* (2013.01)

(58) Field of Classification Search
CPC .............. F03D 7/0256; F05B 2240/221; F05B 2240/2211; Y02E 10/721
See application file for complete search history.

(56) References Cited

U.S. PATENT DOCUMENTS

| | | | |
|---|---|---|---|
| 6,674,181 B2 | 1/2004 | Harbison | |
| 6,710,468 B1 | 3/2004 | Marrero | |
| 6,722,581 B2* | 4/2004 | Saddoughi | B64C 23/06 239/102.1 |
| 7,323,792 B2 | 1/2008 | Sohn | |
| 7,354,247 B2* | 4/2008 | Bonnet | F03D 1/0633 415/905 |
| 7,387,491 B2* | 6/2008 | Saddoughi | F03D 1/0608 415/914 |
| 7,435,057 B2* | 10/2008 | Parera | F03D 1/0633 415/81 |
| 7,994,652 B2 | 8/2011 | Grabau et al. | |
| 8,021,121 B2* | 9/2011 | Mikkelsen | F03D 1/0658 415/4.3 |
| 8,251,638 B2 | 8/2012 | Boyd | |
| 8,287,243 B2* | 10/2012 | Herr | F03D 80/00 29/889 |
| 9,194,363 B2 | 11/2015 | Opaits et al. | |
| 9,194,369 B2* | 11/2015 | Dixon | F03D 1/0675 |
| 2009/0191064 A1 | 7/2009 | Herr et al. | |
| 2009/0317257 A1 | 12/2009 | Mikkelsen et al. | |
| 2009/0324383 A1 | 12/2009 | Mazur | |
| 2010/0166556 A1 | 7/2010 | Kirtley | |
| 2010/0295314 A1 | 11/2010 | Sohn | |
| 2011/0057452 A1 | 3/2011 | Interlandi | |
| 2011/0272951 A1 | 11/2011 | Marchand | |
| 2012/0141250 A1 | 6/2012 | Kinzie et al. | |
| 2012/0171011 A1 | 7/2012 | Iwanow | |
| 2013/0121841 A1 | 5/2013 | Obrecht et al. | |
| 2014/0199156 A1* | 7/2014 | Pineda Amo | F03D 7/0224 415/1 |
| 2015/0361961 A1* | 12/2015 | Chacon | F03D 11/00 415/108 |
| 2017/0211545 A1* | 7/2017 | Saddoughi | F03D 7/022 |

* cited by examiner

APPARATUS AND METHOD FOR AERODYNAMIC PERFORMANCE ENHANCEMENT OF A WIND TURBINE

BACKGROUND

Embodiments disclosed herein relate generally to apparatus and methods for increasing the aerodynamic efficiency of an existing wind turbine. In particular, embodiments disclosed herein relate to apparatus and methods that enable an acceleration of an airflow into more aerodynamically efficient region of a wind turbine rotor blade providing an increase in efficiency of an existing wind turbine.

Commonly, rotor blades of wind turbines do not possess an aerodynamic profile at the inner rotor section. More specifically, the air flow in the inner rotor portion may pass over the rotor of the wind turbine. Accordingly, torque extraction at a root region in wind turbines is typically low. Thus, not all kinetic energy of the wind passing an area that is swept by the rotor blades is used for the energy production. In many instances the inner 20% of the rotor blades do not contribute significantly to energy capture, due to poor aerodynamic design of the blade at these locations. Accelerating the inboard section velocities and pushing the sped-up flow to outer span locations of the rotor blades will help increase the coefficient of power (Cp) of the blade.

Accordingly, there is a need for an improved wind turbine that provides for the acceleration of the flow into and over a more aerodynamically efficient region of the rotor blades.

BRIEF SUMMARY

These and other shortcomings of the prior art are addressed by the present disclosure, which provides an apparatus and method that enable an acceleration of an airflow into and over a more aerodynamically efficient region of a wind turbine rotor blade. The disclosure provide a virtual aerodynamic component for redirecting an incoming wind to the outer parts of the blades, wherein at least one rotor blade is connected to a hub of said wind turbine and defines an inner portion and a profiled outer portion. The virtual aerodynamic component is operational, and thus present, to redirect an incoming wind toward the profiled outer portion of the at least one rotor blade and non-operational, thus not present, during high incoming winds to allow the incoming wind to pass there through toward the inner portion of the at least one rotor blade.

In accordance with an embodiment, provided is a virtual aerodynamic component for a wind turbine wherein at least one rotor blade is connected to a hub of said wind turbine and defines an inner portion and a profiled outer portion. The virtual aerodynamic component comprising one or more air-blowing units, configured to provide a flow of air substantially opposed to an incoming wind, the flow of air defining the virtual aerodynamic component in front of the inner portion of the at least one rotor blade of the wind turbine in operation. The virtual aerodynamic component is configured to redirect the incoming wind toward the profiled outer portion of the at least one rotor blade in an operational state and allow the incoming wind to flow toward the inner portion of the at least one rotor blade in a non-operational state.

In accordance with another embodiment, provided is a wind turbine. The wind turbine comprising a hub, at least one rotor blade connected to the hub and one or more air-blowing units disposed in the wind turbine. The rotor blade comprising an inner portion and a profiled outer portion. The one or more air-blowing units configured to provide a flow of air substantially opposed to an incoming wind. The flow of air defining a virtual aerodynamic component in front of the inner portion of the at least one rotor blade of the wind turbine in operation. The virtual aerodynamic component is configured to redirect the incoming wind toward the profiled outer portion of the at least one rotor blade in an operational state and allow the incoming wind to flow toward the inner portion of the at least one rotor blade in a non-operational state.

In accordance with yet another embodiment, provided is a method for aerodynamic performance enhancement of a wind turbine. The method comprising providing a wind turbine including a hub and at least one rotor blade connected to the hub, the at least one rotor blade having an inner portion and a profiled outer portion. The method further comprising determining the presence of winds exceeding preset parameters, generating a virtual aerodynamic component in front of the inner portion of the at least one rotor blade of the wind turbine to redirect an incoming wind toward the profiled outer portion of the at least one rotor blade when winds do not exceed the preset parameters, and rotating the at least one rotor blade about its longitudinal axis to generate energy. The virtual aerodynamic component generated by one or more air-blowing units disposed in the wind turbine and configured to provide a flow of air substantially opposed to an incoming wind.

Other objects and advantages of the present disclosure will become apparent upon reading the following detailed description and the appended claims with reference to the accompanying drawings.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein.

DETAILED DESCRIPTION

Embodiments of the disclosure will be described for the purposes of illustration only; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

Reference will now be made in detail to the various embodiments of the disclosure, one or more examples of which are illustrated in the figures. Each example is provided by way of explanation of the disclosure, and is not meant as a limitation of the disclosure. For example, features illustrated or described as part of one embodiment can be used on or in conjunction with other embodiments to yield yet a further embodiment. It is intended that the present disclosure includes such modifications and variations.

Figure 1:
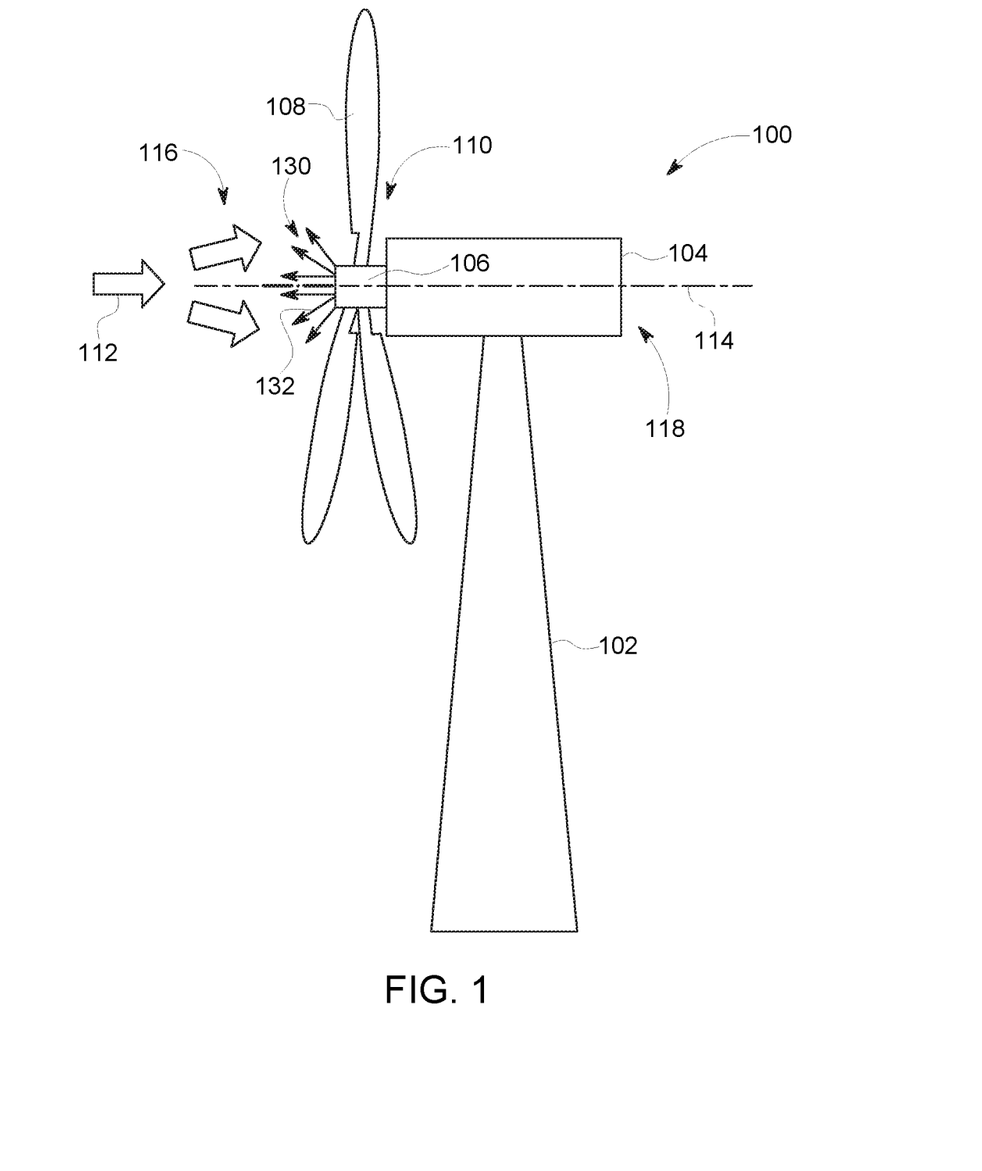
FIG. 1 is schematic side view of a wind turbine including a virtual aerodynamic component, in accordance with one or more embodiments shown or described herein.

FIG. 1 shows a wind turbine 100. The wind turbine 100 includes a tower 102 onto which a nacelle 104 is arranged. Within the nacelle 104 a generator (not shown) for producing electrical current is placed. The generator is connected to a hub 106 with a substantial horizontal shaft. A plurality of rotor blades 108 are coupled to the hub 106 and configured to rotate about an axis (horizontal or vertical) at a rate determined by the wind speed and the shape of the rotor blades 108. Typically the plurality of rotor blades 108 includes two or more rotor blades. The rotor blades 108 and the hub 106 form a rotor 110 of the wind turbine 100. In operation the incoming wind, indicated by arrows 112, imparts a rotation on the rotor 110 due to an aerodynamic profile on the rotor blades 108. More specifically, in the illustrated embodiment, the rotor 110 turns around a substantially horizontal rotor axis 114, which is substantially parallel to the direction of the incoming wind 112. The rotor 110 drives the generator, such that electrical energy is produced from the kinetic energy of the wind 112.

It should be noted that relative adjectives like in front, backward, behind and rear are defined with respect to the wind direction 112 related to a wind turbine 100 in operation, i.e. when the wind turbine 100 produces electrical energy. That means that the wind 112 flows from a front end 116 to a back end 118 of the wind turbine 100. In addition, the terms axial or radial relate to the rotor axis 114 of the hub 106, when the wind turbine 100 produces electrical energy. Thus, as described above, the rotor axis 114 is substantially parallel to the wind 112 direction.

Figure 2:
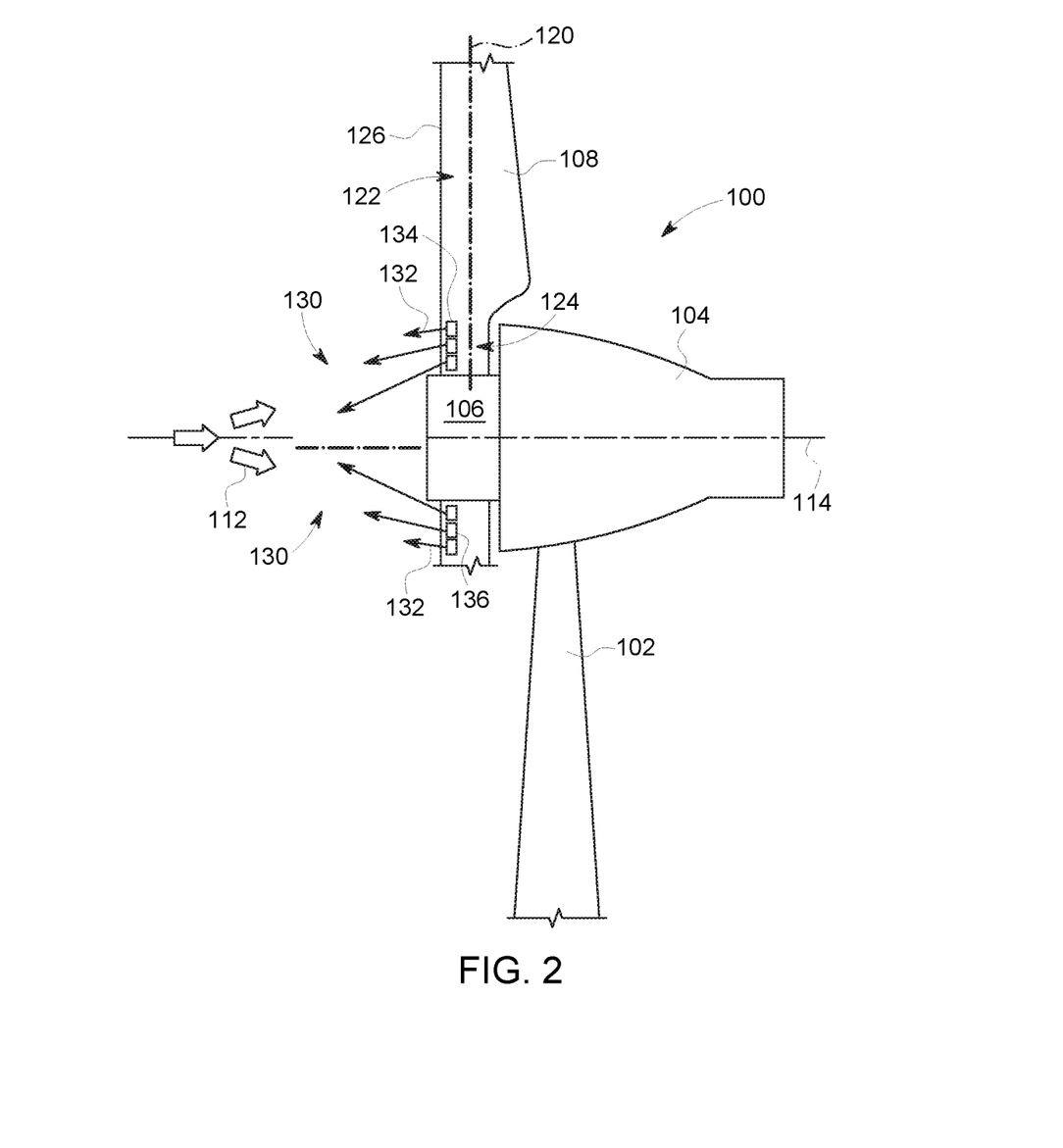
FIG. 2 is an enlarged schematic side view of the wind turbine of FIG. 1 in an operational state, in accordance with one or more embodiments shown or described herein.
Figure 3:
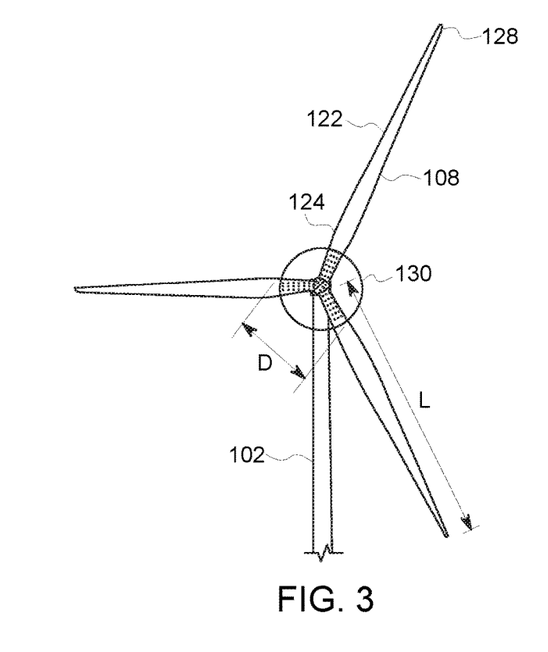
FIG. 3 is an enlarged schematic front view of the wind turbine of FIG. 1, in accordance with one or more embodiments shown or described herein.
Figure 4:
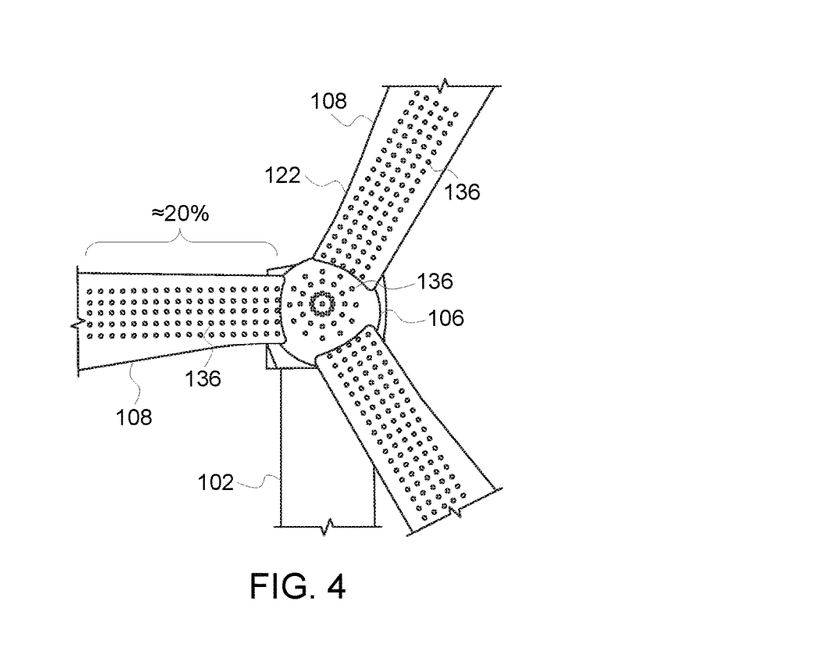
FIG. 4 is front perspective view of a wind turbine illustrating the inclusion of one or more openings for blowing an air to form the virtual aerodynamic component, in accordance with one or more embodiments shown or described herein.

Referring again to the drawings wherein, as previously stated, identical reference numerals denote the same elements throughout the various views, FIGS. 2-4 depict in simplified schematic drawings, a wind turbine according to an embodiment, generally similar to the embodiment of FIG. 1. For the sake of simplicity, only a portion of the plurality of rotor blades 108 is shown in FIGS. 2 and 4. Each of the plurality of rotor blades 108 has an outer portion 122 and an inner portion 124. The terms "outer" and "inner" are used with respect to the hub 106. Therefore, the outer portion 122 of each of the plurality of rotor blades 108 is radially outside of the inner portion 124 in FIG. 2. The inner portion 124 of each of the plurality of rotor blades 108 is connected to the hub 106. In an embodiment, the inner portion 124 of each of the plurality of rotor blades 108 has a substantially circular cross-section, as best illustrated in FIG. 4, for structural purposes. Each rotor blade 108 may be, in a typical embodiment, turned around its longitudinal axis 120 to adjust a pitch angle. For that purpose a pitch mechanism is located in the hub 106 and/or the nacelle 104 of the wind turbine 100. The outer portion 122 of each of the rotor blades 108 has a wing shaped profile, such that the outer portion may also be called profiled section or profiled outer portion 122 of the rotor blade 108. The front end of each of the plurality of rotor blades 108 is typically straight from the connection to the hub 106 to the outer portion 122; in another typical embodiment of the present disclosure the front end of each of the plurality of rotor blades 108 is typically straight to a blade tip 128 of each of the rotor blades 108. Thus, a leading edge 126, i.e. the windward or front edge of each of the plurality of rotor blades 108, defines during operation of the wind turbine 100, i.e. when the hub 106 and the rotor blades 108 turn around the rotor axis 114, a substantially flat disk. Thus, the outer end of the inner portion 124, approximately where the profiled portion begins, i.e. where each of the rotor blades 108 start the leeward protrusion in the embodiment shown in FIG. 2 when looking from a hub sided end of the rotor blade 108 to the blade tip, is defining a circle around the rotor axis 114, as best illustrated in FIG. 3.

As illustrated in FIG. 2, in front, i.e. windward, of the rotor blades 108, a virtual aerodynamic component 130 is provided during an operational state, and according to an embodiment is substantially symmetrically configured with respect to the turning axis 114. In the illustrated embodiment, the virtual aerodynamic component 130 is provided by a flow of air 132, in a direction substantially opposed to the incoming wind direction 112. The virtual aerodynamic component 130 is configured to create a flow blockage and redirecting of the incoming wind 112 as described herein.

The virtual aerodynamic component 130, and more particularly, the flow of air 132 may be generated by one or more air-blowing units 134, such as a pressurized air-blowing unit and/or a dual bimorph synthetic jet (DBSJ), described presently. In an embodiment, the one or more air-bowing units 134 are configured to provide a flow of air from the hub 106, as best illustrated in FIG. 1. In an embodiment, the one or more air-bowing units 134 are configured to provide a flow of air 132 from an inner portion 124 of one or more of the plurality of rotor blades 108, as best illustrated in FIG. 2. In an embodiment, the one or more air-bowing units 134 are configured to provide a flow of air 132 from both the hub 106 and an inner portion 124 of one or more of the plurality of rotor blades 108, as best illustrated in FIG. 4.

The virtual aerodynamic component 130 is in a typical embodiment generated symmetrically forward the hub 106 and at least a portion of the plurality of rotor blades 108 with respect to the turning axis 114 of the wind turbine 100. The virtual aerodynamic component 130 when operational may have a parabolic or semi-spherical outer shape as illustrated in FIGS. 2 and 3, or any other shape capable of redirecting the airflow 112 as indicated herein when operational. When operational, the virtual aerodynamic component 130 guides or redirects incoming wind 112 that is typically directed toward the hub 106 or to the nacelle 104 toward the profiled or outer portions 122 of each of the plurality of rotor blade 108. Thus, kinetic energy of the wind 112 directed toward the hub 106 is also capable of being transformed it to electrical energy.

In an embodiment, the virtual aerodynamic component 130 has a maximum outer diameter D (FIG. 3) in front of the rotor blades 108 that is corresponding substantially to a diameter of the circle defined by the outer end of the inner portion 124 in operation of the wind turbine 100. The maximum outer diameter D might also be slightly greater or smaller than the circle. Hence, the wind 112 directed to the hub 106 and the nacelle 1104 is directed along the virtual aerodynamic component 130 to the outer portion 122 of the rotor blades 108, as indicated by arrows 112. In an embodiment, the flow of air 132 forming the virtual aerodynamic component 130 may be angularly directed to provide complete formation of the virtual aerodynamic component 130 irrespective of emission from the at least one rotors, the hub, or both the at least one rotor and hub. More particularly a complete dome-like structure, based on design parameters, may be generated by the flow of air 132. The aerodynamic shape of the virtual aerodynamic component 130 causes an acceleration in the flow of wind 112 over the more aerodynamically efficient regions of each of the plurality of blades 108.

Figure 5:
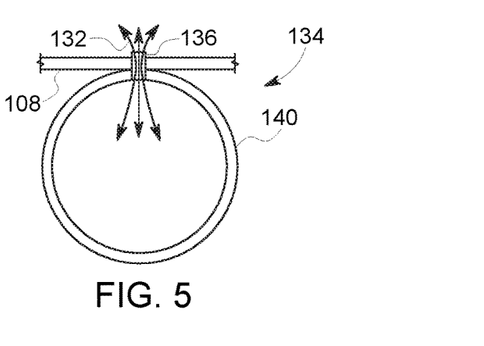
FIG. 5 is a schematic sectional view of an air-blowing unit for use in the wind turbine, in accordance with one or more embodiments shown or described herein.

As best illustrated in FIG. 4, each of the plurality of rotor blades 108 and/or hub 106 includes a plurality of openings 136 in fluid communication with the one or more air-blowing units 134 to provide for the generation of the virtual aerodynamic component 130. In an embodiment, the plurality of openings 136 are distributed on the inner portion 124, and more particularly, approximately 20% of the overall blade length "L" of each of the plurality of rotor blades 108, in a manner so as to face the incoming wind 112. In alternate embodiments, the plurality of openings 136 are distributed on the inner portion 124, and may be more or less than 20% of the overall blade length "L" of each of the plurality of rotor blades 108. In an embodiment, the one or more air-blowing units 134 may be one or more pressurized air-blowing units 138, as best illustrated in FIG. 2, or one or more synthetic jet actuators 140, also referred to herein as dual bimorph synthetic jets (DBSJs), of which a single DBSJ is illustrated in FIG. 5. In an embodiment, each of the plurality of openings 136 is associated with a single air-blowing unit 134. In an alternate embodiment, each air-blowing unit 134 may be associated with a plurality of the plurality of openings 136. Additional information regarding the inclusion of one or more synthetic jet actuators may be found in commonly assigned, U.S. Pat. No. 6,722,581, S. Saddoughi, entitled "Synthetic jet Actuators," incorporated herein in its entirety. The one or more air-blowing units 134, and more particularly, the one or more pressurized air-blowing units 138 or the one or more synthetic jet actuators 140 provide for the generation of the virtual aerodynamic component 130 without the need for complex secondary rotor and gearing systems.

Figure 6:
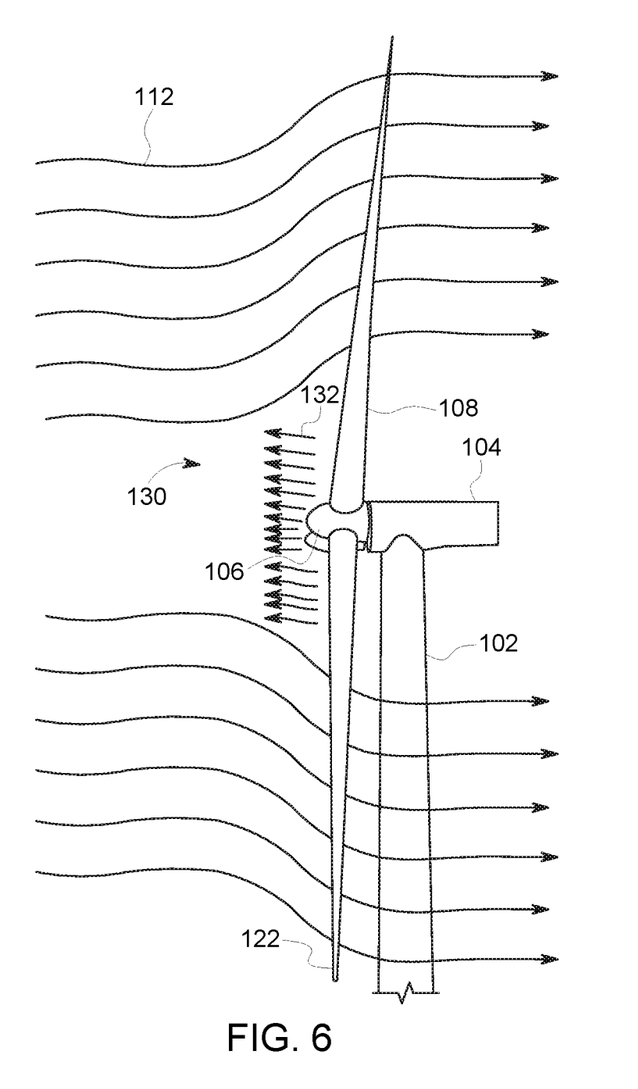
FIG. 6 is a side schematic view of the wind turbine of FIG. 1 including the virtual aerodynamic component in an operating state to illustrate the flow of the incoming wind, in accordance with one or more embodiments shown or described herein.

FIG. 6 illustrates in a simplified schematic the virtual aerodynamic component 130, when in an operational state and the redirecting of the flow of wind 112. More particularly, during a low/normal wind occurrence, when loading/drag or thrust loads are amenable for the operation of the virtual aerodynamic component 130, the virtual aerodynamic component 130 redirects the incoming air 112 to the outer portions 122 of the plurality of rotor blades 108. In an embodiment, the operational state of the virtual aerodynamic component 130 resembles a dome-like structure as best illustrated in FIGS. 1, 2, 3 and 6. The aerodynamic shape of the virtual aerodynamic component 130 when in the operational state maximizes blockage or redirecting of the flow of wind 112 and allows the wind 112 to flow toward the outer portions 122 of the plurality of blades 108.

Figure 7:
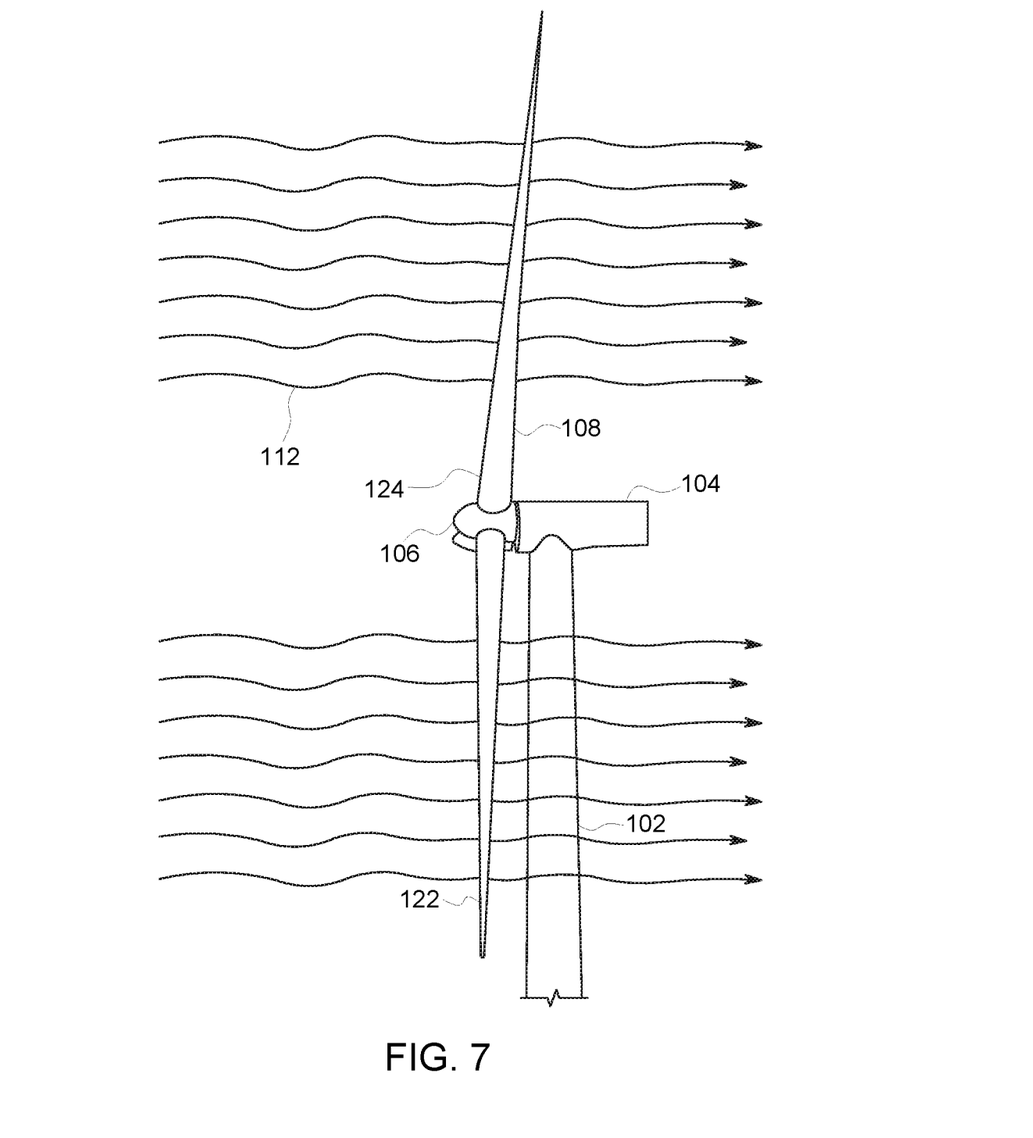
FIG. 7 is a side schematic view of the wind turbine of FIG. 1 when the virtual aerodynamic component is in a non-operating state to illustrate the flow of the incoming wind, in accordance with one or more embodiments shown or described herein.

FIG. 7 illustrates in a simplified schematic the virtual aerodynamic component 130, when in a non-operational state with minimal/to no effect on the flow of wind 112. More particularly, during a high wind occurrence, when loading/drag or thrust loads become too great for the virtual aerodynamic component 130 to provide redirection of the wind 112, or simply when redirection of the wind 112 is not sought, the virtual aerodynamic component 130, and more particularly the one or more air-blowing units 134 are non-operational. The non-operational status of the one or more air-blowing units 134 minimizes any blockage or redirecting of the flow of wind 112 and allows the wind 112 to flow toward the plurality of blades 108 as is typical.

In some embodiments, a substantial portion of the inner portions 124 of the plurality of rotor blades 108 might be covered by the virtual aerodynamic component 130 in direction of the wind 112. A substantial portion of the inner portion may be 50 to 100 percent, 75 to 100 percent, or 90 to 100 percent of a total length of the inner portion 124. In an embodiment, approximately 20% of the overall blade length "L" of each of the plurality of rotor blades 108 is covered by the virtual aerodynamic component 130, in a manner so as to face the incoming wind 112. In alternate embodiments, greater than 20%, or less than 20%, of the overall blade length "L" of each of the plurality of rotor blades 108 is covered by the virtual aerodynamic component 130, in a manner so as to face the incoming wind 112. The total length of the inner portion 124 is typically the distance from a connecting flange for connecting each of the rotor blades 108 to the hub 106 to the beginning of the airfoiled or profiled outer portion 122 of the rotor blade 108. In an embodiment, the virtual aerodynamic component 130 may have a maximal outer diameter D of about the diameter of the circle defined by the outer end of the inner portion 124 in operation of the wind turbine 100.

The generation of the virtual aerodynamic component 130, as illustrated in FIGS. 1, 2, 3, 4, and 6, creates a dynamic structure in front of the plurality of rotor blades 108. When the flow of air 132 is actuated to create the virtual aerodynamic component 130, the component 130 provides blockage and redirecting of the incoming wind 112 toward the outer portions 122 of each of the plurality of rotor blades 108, as previously described. In addition, the aerodynamic shape of the virtual aerodynamic component 130 causes an acceleration in the flow of wind 112 over the more aerodynamically efficient regions of each of the plurality of blades 108.

Figure 8:
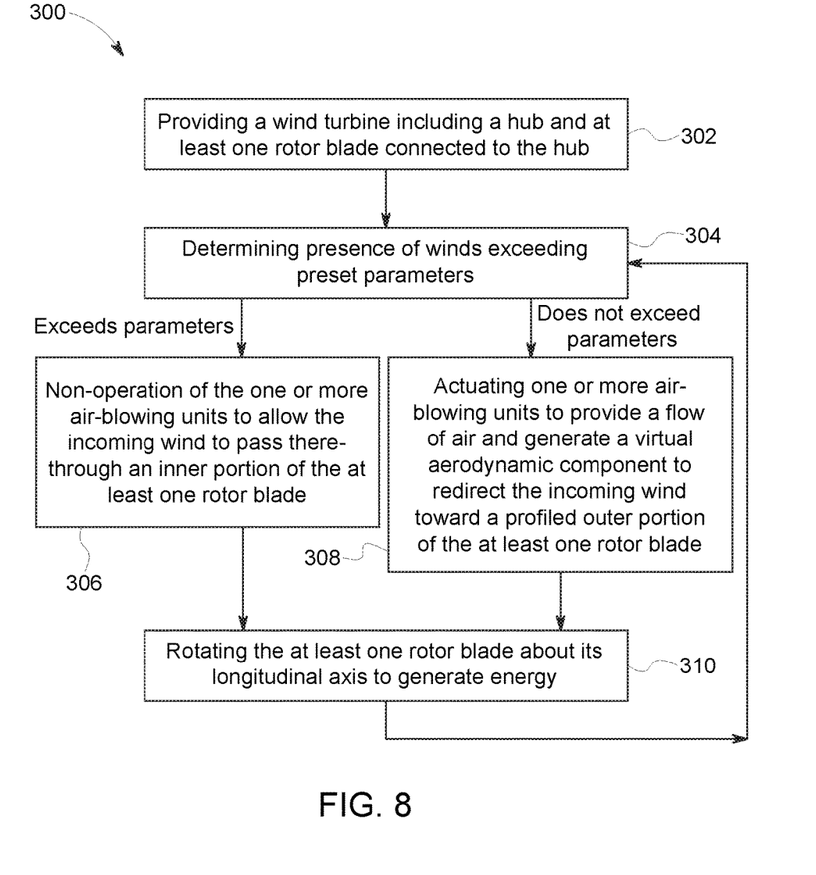
FIG. 8 is a schematic block diagram of method for aerodynamic performance enhancement of a wind turbine, in accordance with one or more embodiments shown or described herein.

In FIG. 8 a method for aerodynamic performance enhancement of a wind turbine, thus improving the efficiency of an existing wind turbine, is shown at 300. In a first step 302, a wind turbine is provided. The wind turbine includes a hub and at least one rotor blade connected to the hub. The at least one rotor blade has an inner portion and a profiled outer portion as previously described here-above. Next, in step 304, a determination is made as to the presence of winds exceeding preset parameters. If the incoming wind exceeds preset parameters, the wind turbine operates in a standard mode without the use of the virtual aerodynamic component as described herein, in a step 306. Operation in step 306 allows the incoming wind to pass therethrough toward an inner portion of the at least one rotor blade. If the wind does not exceed preset parameters, the flow of air 132 is actuated to create the virtual aerodynamic component 130 to redirect an incoming wind toward a profiled outer portion of the at least one rotor blade, at step 308 and provide increased efficiency and enhanced aerodynamic performance of the wind turbine. At a step 310, the wind turbine is operated by rotating the at least one rotor blade about its longitudinal axis to generate energy. Step 304 is repeated during operation of the wind turbine to determine the need to commence or cease the flow of air 132 so as to create the virtual aerodynamic component 130, as described in steps 306 and 308.

Disclosed is a virtual aerodynamic component for enhanced aerodynamic performance of a wind turbine. The virtual aerodynamic component having dimensions such that the air impinging the wind turbine at the inner rotor diameter will be guided to profiled rotor blade portions and thus will increase the energy capture of the wind turbine. In a typical embodiment of the virtual aerodynamic component the outer dimensions of the nacelle may be adapted to the virtual aerodynamic component to increase energy capture and to avoid vortex in the down flow wind stream. Therefore the energy capture is increased, and less energy is loss as the air stream at the inner rotor diameter is guided to the profiled rotor blade portions.

The virtual aerodynamic component may be generated by a flow of air in a direction substantially opposed to the incoming wind. In an embodiment, the flow of wind may be angularly directed to provide complete formation of the virtual aerodynamic component, and more particularly a dome-like structure, based on design parameters. Embodiments disclosed herein include a virtual aerodynamic component having a substantially dome-shaped configuration when generated. In alternate embodiments, the virtual aerodynamic component may not be a full 360 degrees, and may be configured having a "shroud-like" shape to direct the incoming wind in an upward and outward direction toward the airfoiled shaped outer portion of the rotor blades and/or to substantially cover each of the plurality of blades only.

Accordingly, disclosed is an apparatus and method for aerodynamic performance enhancement of a wind turbine configured to operate to redirect an incoming wind toward a profiled outer portion of the at least one rotor blade when operational and during non-operation to allow the incoming wind to pass therethrough toward the inner portion of the at least one rotor blade. It will be understood that the previous apparatus configurations and modes of operation described herein are merely examples of proposed apparatus configurations and operating conditions. What is significant is the apparatus provides for enhanced aerodynamic performance and thus increased efficiency of a wind turbine without the need for complex secondary rotor and gearing systems.

The foregoing has described an apparatus and method for aerodynamic performance enhancement of a wind turbine. While the present disclosure has been described with respect to a limited number of embodiments, those skilled in the art, having benefit of this disclosure, will appreciate that other embodiments may be devised which do not depart from the scope of the disclosure as described herein. While the present disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

The invention claimed is:

1. A wind turbine comprising:
    at least one rotor blade connected to a hub of said wind turbine, each of the at least one rotor blade comprising an inner portion and a profiled outer portion and wherein the inner portion extends from the hub to a start of the profiled outer portion; and
    at least one dual bimorph synthetic jet (DBSJ) in fluid communication with a plurality of openings formed in one of the hub or the inner portion of the at least one rotor blade and the hub, the at least one dual bimorph synthetic jet (DBSJ) generating a flow of pressurized air through the plurality of openings that is opposed to an incoming wind directed at the plurality of openings,
    wherein the flow of pressurized air redirects the incoming wind directed at the plurality of openings toward the profiled outer portion of the at least one rotor blade in an operational state and does not redirect the incoming wind directed at the plurality of openings in a non-operational state.

2. The wind turbine as claimed in claim 1, wherein the at least one dual bimorph synthetic jet (DBSJ) is disposed in the inner portion of the at least one rotor blade and the hub.

3. The wind turbine as claimed in claim 1, wherein the at least one dual bimorph synthetic jet (DBSJ) is disposed in the hub and not in the at least one rotor blade.

4. The wind turbine as claimed in claim 1, wherein the plurality of openings are formed in the inner portion of the at least one rotor blade and in the hub and wherein the plurality of openings are distributed along 20% of an overall blade length of each of the least one rotor blade.

5. The wind turbine as claimed in claim 1, wherein the plurality of openings are oriented to face the incoming wind.

6. The wind turbine as claimed in claim 1, wherein the at least one rotor blade rotates about its longitudinal axis for pitch angle adjustment of the at least one rotor blade.

7. The wind turbine according to claim 1, wherein in a front view, the flow of pressurized air has a maximum diameter in front of the plurality of rotor blades that corresponds to a diameter of a circle defined by the inner portion of the plurality of rotor blades.

8. The wind turbine according to claim 1, wherein in a side view the flow of pressurized air has a paraboloidal shape.

9. A wind turbine comprising:
    a hub;
    at least one rotor blade connected to the hub, the at least one rotor blade comprising an inner portion and a profiled outer portion defined by a leeward protrusion, and wherein the inner portion extends from the hub to a start of the leeward protrusion of the profiled outer portion; and
    at least one dual bimorph synthetic jet (DBSJ) disposed in the wind turbine and in fluid communication with a plurality of openings formed in one of the hub or in the inner portion of the at least one rotor blade and the hub, the at least one dual bimorph synthetic jet (DBSJ) generating a flow of pressurized air through the plurality of openings that is opposed to an incoming wind directed at the plurality of openings,
    wherein the flow of pressurized air redirects the incoming wind directed at the plurality of openings toward the profiled outer portion of the at least one rotor blade in an operational state and does not redirect the incoming wind directed at the plurality of openings in a non-operational state.

10. The wind turbine according to claim 9, wherein the plurality of openings are formed in the inner portion of the at least one rotor blade and in the hub and wherein the plurality of openings formed in the inner portion of the at least one rotor blade
   are distributed along 20% of the overall blade length "L" of the at least one rotor blade in a manner so as to face the incoming wind.

11. The wind turbine according to claim 9, wherein the at least one dual bimorph synthetic jet (DBSJ) is disposed in the inner portion of the at least one rotor blade and the hub.

12. The wind turbine according to claim 9, wherein the at least one dual bimorph synthetic jet (DBSJ) is disposed in the hub and not in the at least one rotor blade.

13. The wind turbine according to claim 9, wherein the plurality of openings are oriented to face the incoming wind.

14. A method for aerodynamic performance enhancement of a wind turbine comprising:

providing the wind turbine including a hub and at least one rotor blade connected to the hub, the at least one rotor blade having an inner portion and a profiled outer portion, and wherein the inner portion extends from the hub to the profiled outer portion;

determining the presence of winds exceeding preset parameters;

rotating the at least one rotor blade about its longitudinal axis to generate energy, wherein the wind turbine includes a plurality of openings formed in one of the hub or the inner portion of the at least one rotor blade and the hub and wherein a flow of pressurized air flows through the plurality of openings, and directing the flow of pressurized air in a direction opposed to an incoming wind to redirect the incoming wind toward the profiled outer portion of the at least one rotor blade when winds to not exceed the preset parameters.

* * * * *